(12) United States Patent
Wu

(10) Patent No.: US 11,102,686 B2
(45) Date of Patent: Aug. 24, 2021

(54) DEVICE AND METHOD OF HANDLING A HANDOVER

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 200 days.

(21) Appl. No.: 16/058,974

(22) Filed: Aug. 8, 2018

(65) Prior Publication Data

US 2019/0053113 A1 Feb. 14, 2019

Related U.S. Application Data

(60) Provisional application No. 62/566,328, filed on Sep. 30, 2017, provisional application No. 62/543,998, filed on Aug. 11, 2017.

(51) Int. Cl.
*H04W 36/08* (2009.01)
*H04W 36/02* (2009.01)
*H04W 36/00* (2009.01)

(52) U.S. Cl.
CPC ....... *H04W 36/08* (2013.01); *H04W 36/0033* (2013.01); *H04W 36/02* (2013.01); *H04W 36/023* (2013.01)

(58) Field of Classification Search
CPC .......................... H04W 36/0033; H04W 36/02; H04W 36/023
See application file for complete search history.

(56) References Cited

U.S. PATENT DOCUMENTS

| 2008/0019515 A1 | 1/2008 | Tseng |
| 2016/0255545 A1 | 9/2016 | Gholmieh |
| 2017/0150534 A1 | 5/2017 | Van Lieshout |

(Continued)

FOREIGN PATENT DOCUMENTS

| CN | 101365168 A | 2/2009 |
| CN | 102802188 B | 5/2016 |

(Continued)

OTHER PUBLICATIONS

Search Report dated Dec. 7, 2018 for EP application No. 18188541.9, pp. 1-5.

(Continued)

*Primary Examiner* — Michael Thier
*Assistant Examiner* — Nevena Zecevic Sandhu
(74) *Attorney, Agent, or Firm* — Winston Hsu

(57) ABSTRACT

A network comprising a first BS and a second BS for handling a handover comprises at least one storage device storing instructions of: the first BS transmitting a first RRC message configuring a DRB on a SRB to a communication device and receiving a first RRC response message on the SRB; the first BS receiving a first plurality of PDCP SDUs; the first BS performing a handover preparation procedure with the second BS and transmitting a second RRC message on the SRB to the communication device; the second BS receiving a second RRC response message on the SRB; the first BS transmitting at least one of a RX_NEXT, a RX_DELIV and a RX_REORD; the second BS receiving a second plurality of PDCP SDUs and processing the second plurality of PDCP SDUs according to the at least one of the RX_NEXT, the RX_DELIV and the RX_REORD.

14 Claims, 7 Drawing Sheets

(56) References Cited

U.S. PATENT DOCUMENTS

2017/0223766 A1 8/2017 Lin
2018/0132128 A1* 5/2018 Koskinen .............. H04L 1/1832
2019/0053099 A1* 2/2019 Kim ........................ H04L 47/34
2019/0342808 A1* 11/2019 Huang .............. H04W 36/0011

FOREIGN PATENT DOCUMENTS

CN    105578548 A    5/2016
EP    3 203 805 A1   8/2017

OTHER PUBLICATIONS

3GPP TS 36.300 V14.3.0 (Jun. 2017), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", XP051299009, pp. 1-331.

3GPP TS 36.331 V14.3.0 (Jun. 2017), "3rd Generation Partnership Project; Technical Specification Group Radio Access Network; Evolved Universal Terrestrial Radio Access (E-UTRA); Radio Resource Control (RRC); Protocol specification (Release 14)", XP051336663, pp. 1-745.

3GPP TS 38.322 V0.2.0(Jul. 2017), "3rd Generation Partnership Project; Technical Specification Group Radio Access Network; NR; Radio Link Control (RLC) protocol specification (Release 15)", XP051336678, pp. 1-30.

Ericsson, "Lossless PDCP SN reconfiguration at HO", 3GPP TSG-RAN WG2 #98, R2-1704369, May 15-19, 2017, Hangzhou, P.R. of China, XP051274943, pp. 1-5.

Office action dated Dec. 28, 2018 for the Taiwan application No. 107127788, filing date Aug. 9, 2018, pp. 1-3.

3rd Generation Partnership Project;Technical Specification Group Radio Access Network; NG Radio Access Network(NG-RAN); Xn application protocol (XnAP)(Release 15), <3GPP TS 38.423 V0.1.1(Jun. 2017)>, p. 1-53, Jun. 19, 2017.

3rd Generation Partnership Project;Technical Specification Group Radio Access Network; NR; Packet Data Convergence Protocol (PDCP) specification(Release 15), <3GPP TS 38.323 V0.2.0(Aug. 2017)>, p. 1-29, Jul. 19, 2017.

Office action dated Jul. 29, 2020 for the China application No. 201810912701.0, filing date Aug. 10, 2018, p. 1-6.

* cited by examiner

| Bit | Description |
|---|---|
| 0 | PDCP SDU with COUNT = (the COUNT value of the first missing PDCP SDU + bit position) modulo $2^{32}$ is missing |
| 1 | PDCP SDU with COUNT = (the COUNT value of the first missing PDCP SDU + bit position) modulo $2^{32}$ is correctly received |

FIG. 4

DEVICE AND METHOD OF HANDLING A HANDOVER

CROSS REFERENCE TO RELATED APPLICATIONS

This application claims the benefit of U.S. Provisional Applications No. 62/543,998, filed on Aug. 11, 2017, and No. 62/566,328, filed on Sep. 30, 2017, which are incorporated herein by reference.

BACKGROUND OF THE INVENTION

1. Field of the Invention

The present invention relates to a device and a method used in a wireless communication system, and more particularly, to a device and a method of handling a handover.

2. Description of the Prior Art

A new radio (NR) system is developed recently in the 3rd generation partnership project (3GPP). A UE may communicate with a NR base station (BS) (or called gNB) in a standalone or non-standalone mode. The UE may communicate with the gNB in dual connectivity (DC) with an evolved Node-B (eNB) or another gNB. The UE may communicate with the gNB without the DC.

SUMMARY OF THE INVENTION

The present invention therefore provides a communication device and method for handling a handover to solve the abovementioned problem.

A network comprising a first base station (BS) and a second BS for handling a handover comprises at least one storage device; and at least one processing circuit, coupled to the at least one storage device, wherein the at least one storage device stores, and the at least one processing circuit is configured to execute instructions of: the first BS transmitting a first Radio Resource Control (RRC) message on a signaling radio bearer (SRB) to a communication device, wherein the first RRC message configures a data radio bearer (DRB); the first BS receiving a first RRC response message from the communication device on the SRB, in response to the first RRC message; the first BS receiving a first plurality of Packet Data Convergence Protocol (PDCP) Service Data Units (SDUs) associated to the DRB from the communication device; the first BS processing the first plurality of PDCP SDUs according to a RX_NEXT, a RX_DELIV and a RX_REORD which are associated to the DRB; the first BS performing a handover preparation procedure with the second BS for the communication device, to hand over the communication device to the second BS; the first BS transmitting a second RRC message on the SRB to the communication device in response to the handover preparation procedure; the second BS receiving a second RRC response message responding to the second RRC message on the SRB from the communication device; the first BS transmitting at least one of the RX_NEXT, the RX_DELIV and the RX_REORD to the second BS; the second BS receiving a second plurality of PDCP SDUs associated to the DRB from the communication device; and the second BS processing the second plurality of PDCP SDUs according to the at least one of the RX_NEXT, the RX_DELIV and the RX_REORD.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a bitmap of a bit position according to an example of the present invention.

DETAILED DESCRIPTION

Figure 1:
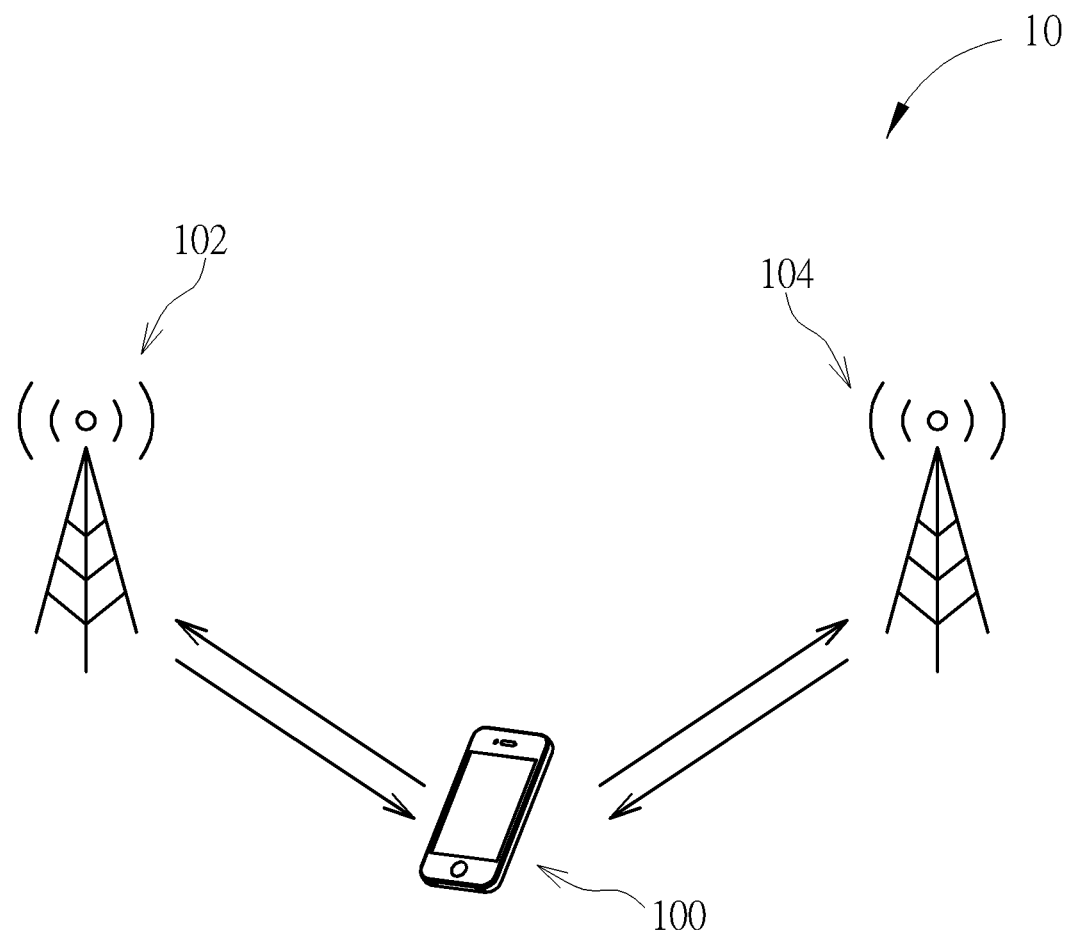
FIG. 1 is a schematic diagram of a wireless communication system according to an example of the present invention.

In FIG. 1, the wireless communication system 10 is briefly composed of a communication device 100, a base station (BS) 102 and a BS 104. FIG. 1 is an example simply utilized for illustrating the structure of the wireless communication system 10. In FIG. 1, coverage areas of the BS 102 and the BS 104 may be partly overlapped.

In FIG. 1, the communication device 100 connects to the BS 102. The communication device 100 receives protocol data units (PDUs) from the BS 102 and transmits PDUs to the BS 102. The BS 102 receives a measurement report from the communication device 100. The BS 102 determines to hand over the communication device 100 to the BS 104 according to the measurement report. In response to the determination, the BS 102 performs a handover preparation procedure via an Xn interface or a Next Generation (NG) interface to hand over the UE to the BS 104. For the handover preparation procedure via the Xn interface, the BS 102 transmits a Handover Request message to the BS 104 and receives a Handover Request Acknowledge message from the BS 104. The Handover Request Acknowledge message includes a Radio Resource Control (RRC) message for a handover, and the BS 102 and the BS 104 transmits the RRC message to the communication device 100. For the handover preparation procedure via the NG interface, the BS 102 transmits a Handover Required message to an Access and Mobility Management Function (AMF) and receives a Handover Command message from the AMF. The Handover Command message includes a RRC message for a handover, and the BS 102 transmits the RRC message to the communication device 100. The communication device 100 performs the handover to the BS 104 according to the RRC message. The communication device 100 transmits a RRC response message to the BS 104 in response to the RRC message.

The communication device 100 may be a user equipment (UE), a mobile phone, a laptop, a tablet computer, an electronic book, a portable computer system, a vehicle, a ship or an aircraft. In addition, the BS (s) and the communication device can be seen as a transmitter or a receiver according to direction (i.e., transmission direction), e.g., for an uplink (UL), the communication device is the transmitter and the BS (s) is/are the receiver, and for a downlink (DL), the BS (s) is/are the transmitter and the communication device is the receiver.

Figure 2:
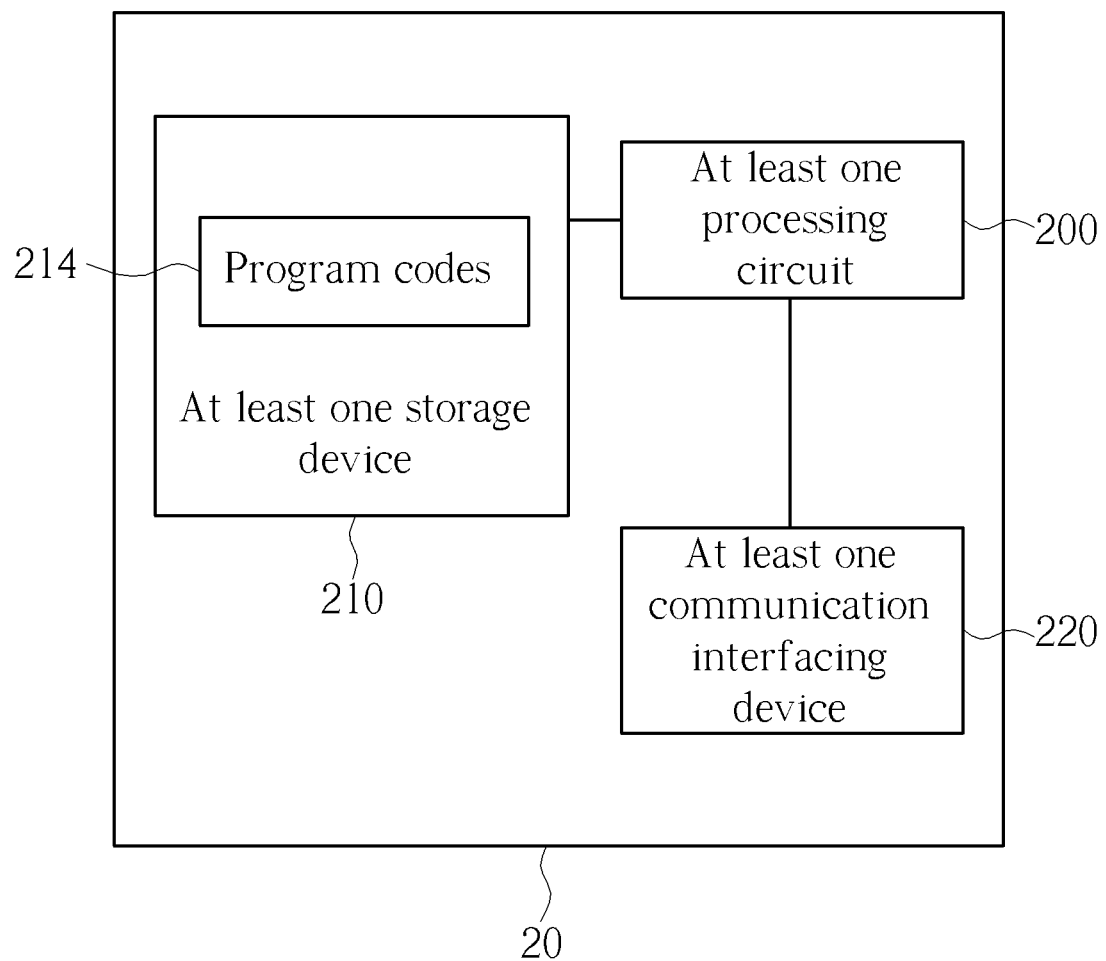
FIG. 2 is a schematic diagram of a communication device according to an example of the present invention.

In FIG. 2, the communication device 20 may be the communication device 100, the BS (s) 102 and/or 104 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

A radio bearer (RB) may be a data RB (DRB) for a user plane data transmission and/or reception, or a signaling RB (SRB) for a control plane data transmission and/or reception. A DRB configuration may include at least one of a DRB identity, a packet data convergence protocol (PDCP) configuration, a radio link control (RLC) configuration, a logical channel identity and a logical channel configuration (e.g., priority and/or logical channel group). A SRB configuration may include a SRB identity, the RLC configuration and the logical channel configuration.

A BS (e.g., the BS 102 or the BS 104) uses the following state variables to communicate PDCP Service Data Units (SDUs) associated to a DRB or a SRB with a communication device (e.g., the communication device 100).

TX_NEXT

The TX_NEXT indicates a COUNT value of a next PDCP SDU to be transmitted. For example, the initial value may be 0.

RX_NEXT

The RX_NEXT indicates a COUNT value of a next PDCP SDU expected to be received. For example, the initial value may be 0.

RX_DELIV

The RX_DELIV indicates a COUNT value of a first PDCP SDU not delivered to upper layers, but still waited for. For example, the initial value may be 0.

RX_REORD

The RX_REORD indicates a COUNT value following the COUNT value associated with a PDCP Data PDU which triggered a t-Reordering to be started or restarted.

In the following examples, a UE is used to represent the communication device 100 in FIG. 1, to simplify the illustration of the embodiments.

Figure 3A:
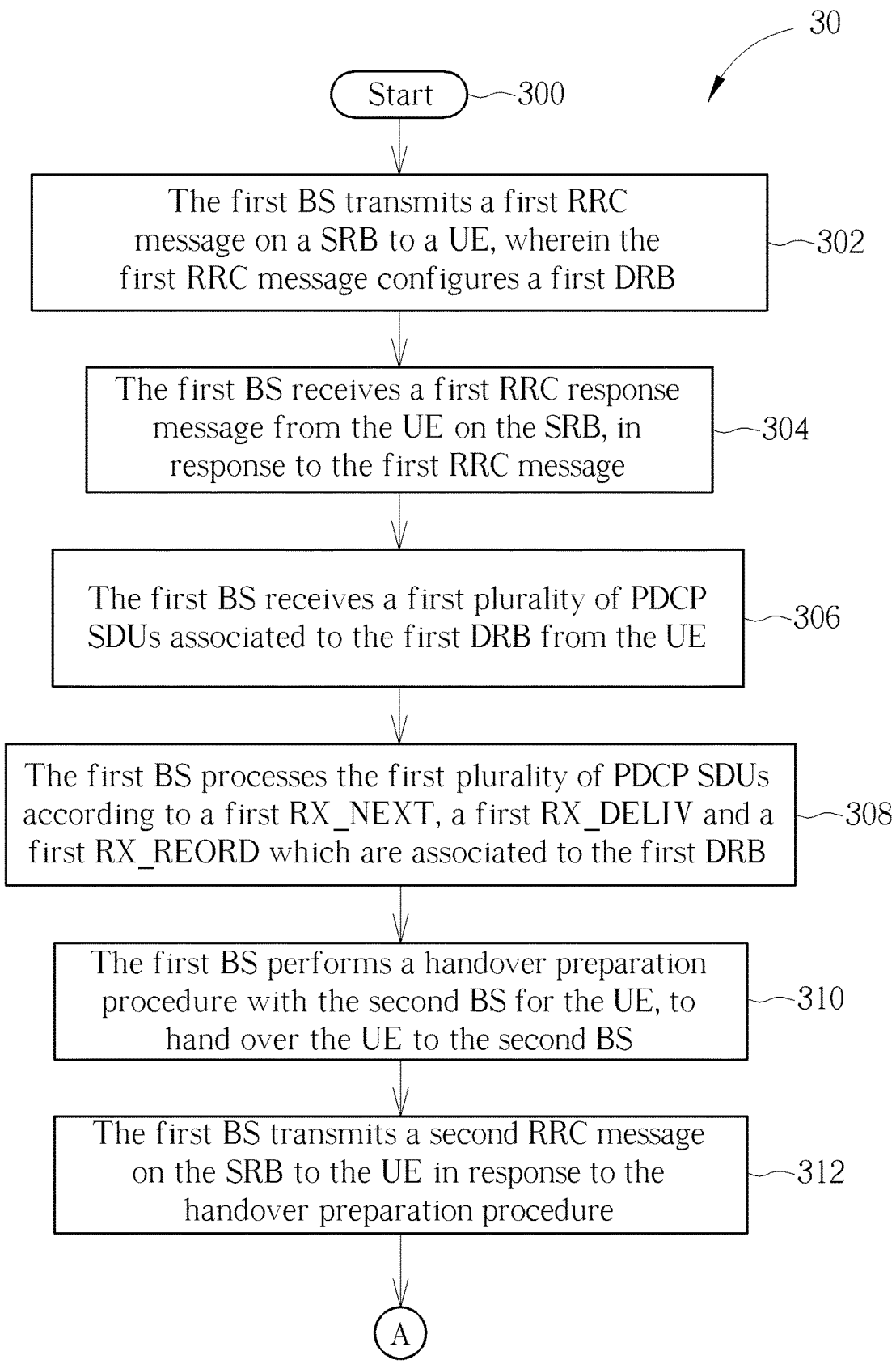
FIG. 3A and FIG. 3B are flowcharts of a process according to an example of the present invention.
Figure 3B:
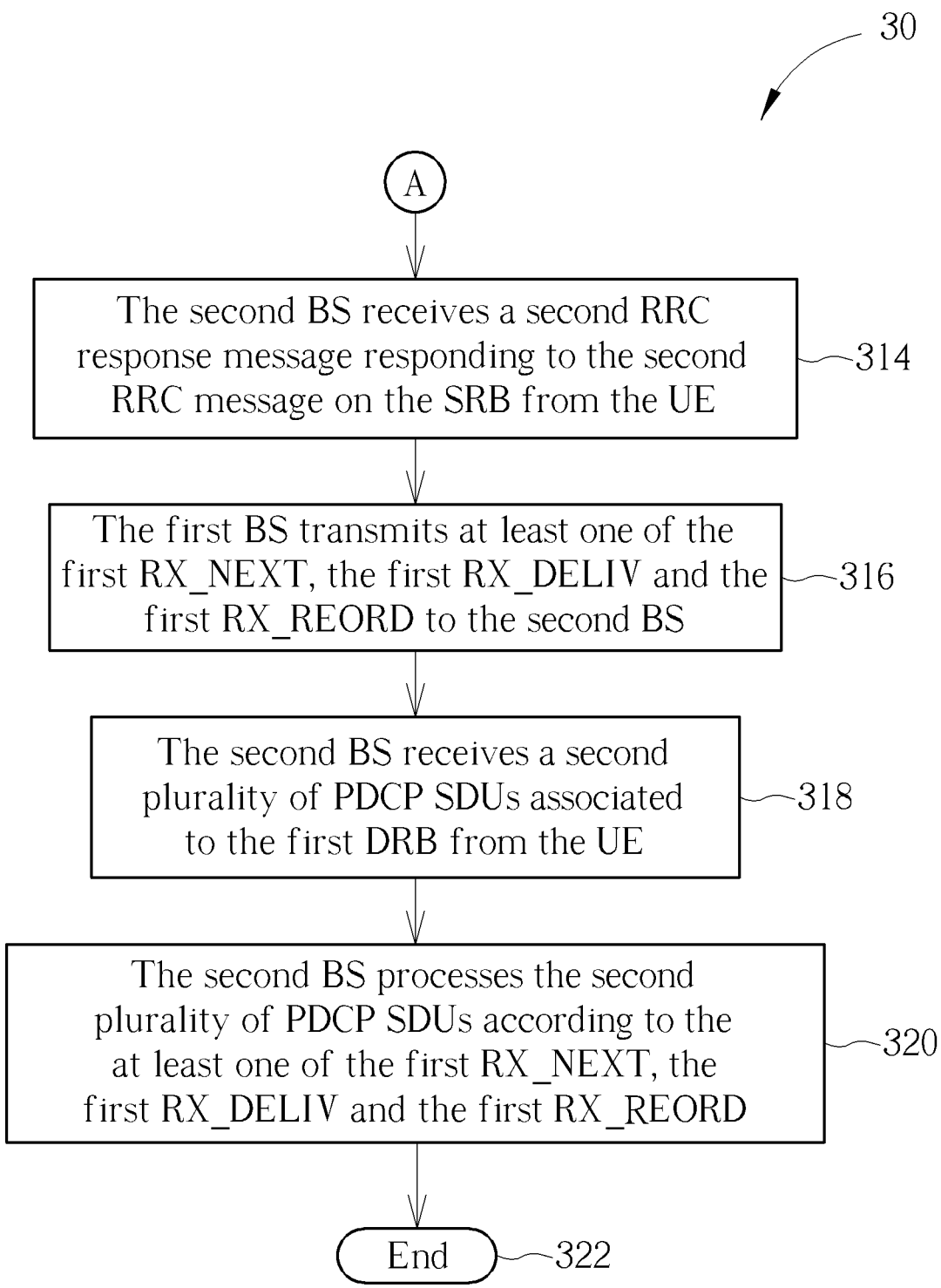

A process 30 in FIG. 3A and FIG. 3B is utilized in a network including a first BS (e.g., the BS 102) and a second BS (e.g., the BS 104), and includes the following steps:

Step 300: Start.

Step 302: The first BS transmits a first RRC message on a SRB to a UE, wherein the first RRC message configures a first DRB.

Step 304: The first BS receives a first RRC response message from the UE on the SRB, in response to the first RRC message.

Step 306: The first BS receives a first plurality of PDCP SDUs associated to the first DRB from the UE.

Step 308: The first BS processes the first plurality of PDCP SDUs according to a first RX_NEXT, a first RX_DELIV and a first RX_REORD which are associated to the first DRB.

Step 310: The first BS performs a handover preparation procedure with the second BS for the UE, to hand over the UE to the second BS.

Step 312: The first BS transmits a second RRC message on the SRB to the UE in response to the handover preparation procedure.

Step 314: The second BS receives a second RRC response message responding to the second RRC message on the SRB from the UE.

Step 316: The first BS transmits at least one of the first RX_NEXT, the first RX_DELIV and the first RX_REORD to the second BS.

Step 318: The second BS receives a second plurality of PDCP SDUs associated to the first DRB from the UE.

Step 320: The second BS processes the second plurality of PDCP SDUs according to the at least one of the first RX_NEXT, the first RX_DELIV and the first RX_REORD.

Step 322: End.

In one example, the first BS transmits the at least one of the first RX_NEXT (value), the first RX_DELIV (value) and the first RX_REORD (value) to the second BS in response to the handover preparation procedure.

In one example, the first BS transmits the at least one of the first RX_NEXT (value), the first RX_DELIV (value) and the first RX_REORD (value) via an interface (e.g., Xn interface) between the first BS and the second BS or via an interface between the first BS and a core network (e.g., an AMF). In the case of the interface between the first BS and the AMF, the AMF forwards the at least one of the first RX_NEXT (value), the first RX_DELIV (value) and the first RX_REORD (value) to the second BS.

In one example, the first BS updates the first RX_NEXT, the first RX_DELIV and the first RX_REORD to other values (i.e., not initial values), when processing the first plurality of PDCP SDUs.

In one example, the first BS transmits all of the first RX_NEXT (value), the first RX_DELIV (value) and the first RX_REORD (value) to the second BS.

In one example, the first BS does not transmit one of the at least one of the first RX_NEXT (value), the first RX_DELIV (value) and the first RX_REORD (value) to the second BS. For example, the first BS does not transmit the first RX_REORD to the second BS. The second BS may set a second RX_REORD to the first RX_NEXT and may use the second RX_REORD to process the second plurality of PDCP SDUs. For example, the first BS does not transmit the first RX_NEXT to the second BS. The second BS may set a second RX_NEXT to the first RX_REORD or the first RX_DELIV and may use the second RX_NEXT to process the second plurality of PDCP SDUs.

In one example, the first BS transmits status information of at least one PDCP SDU (different from the first plurality of PDCP SDUs and the second plurality of PDCP SDUs) with at least one COUNT value or at least one PDCP Sequence Number (SN) after the first RX_DELIV and a COUNT value. In one example, the status information includes (or indicates) the at least one COUNT value of the at least one PDCP SDU which is missing.

FIG. 4 is a bitmap of a bit position according to an example of the present invention. In one example, the status information includes the bitmap indicating which PDCP SDU(s) is missing and which PDCP SDU(s) is correctly received in a receiving PDCP entity. A bit position of the N-th bit in the bitmap is N, e.g., the bit position of the first bit in the bitmap is 1.

For example, the first BS does not transmit the first RX_NEXT to the second BS. The second BS may set the second RX_NEXT to a COUNT value derived from the first RX_DELIV and the status information, and may use the second RX_NEXT to process the second plurality of PDCP SDUs. The COUNT value may be derived from a COUNT value of a last PDCP SDU of the at least one PDCP SDU indicated in the status information. For example, the COUNT value of the last PDCP SDU is derived from the first RX_DELIV and a position of a last bit with a value=1 in the bitmap.

Figure 5A:
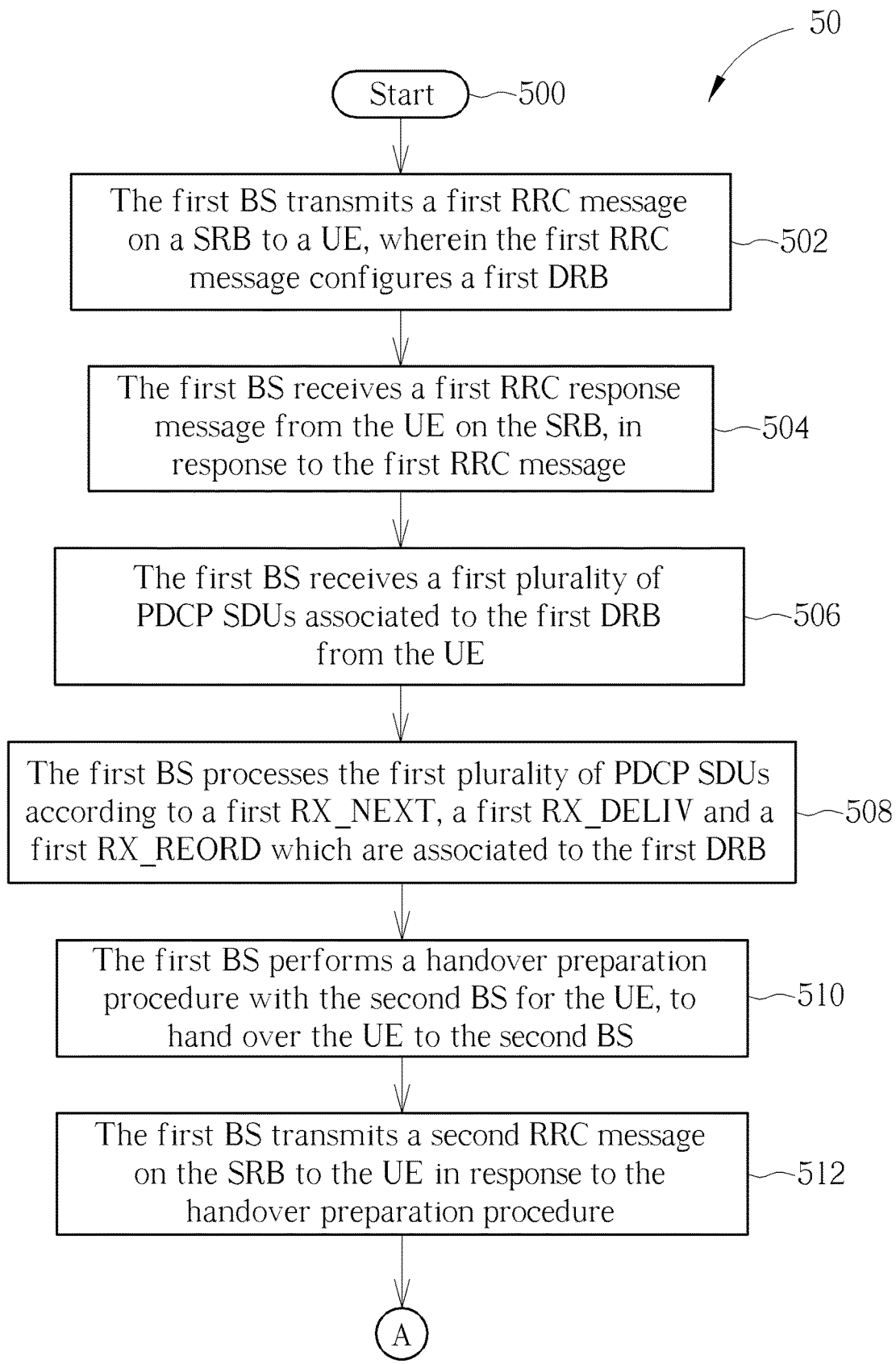
FIG. 5A and FIG. 5B are flowcharts of a process according to an example of the present invention.
Figure 5B:
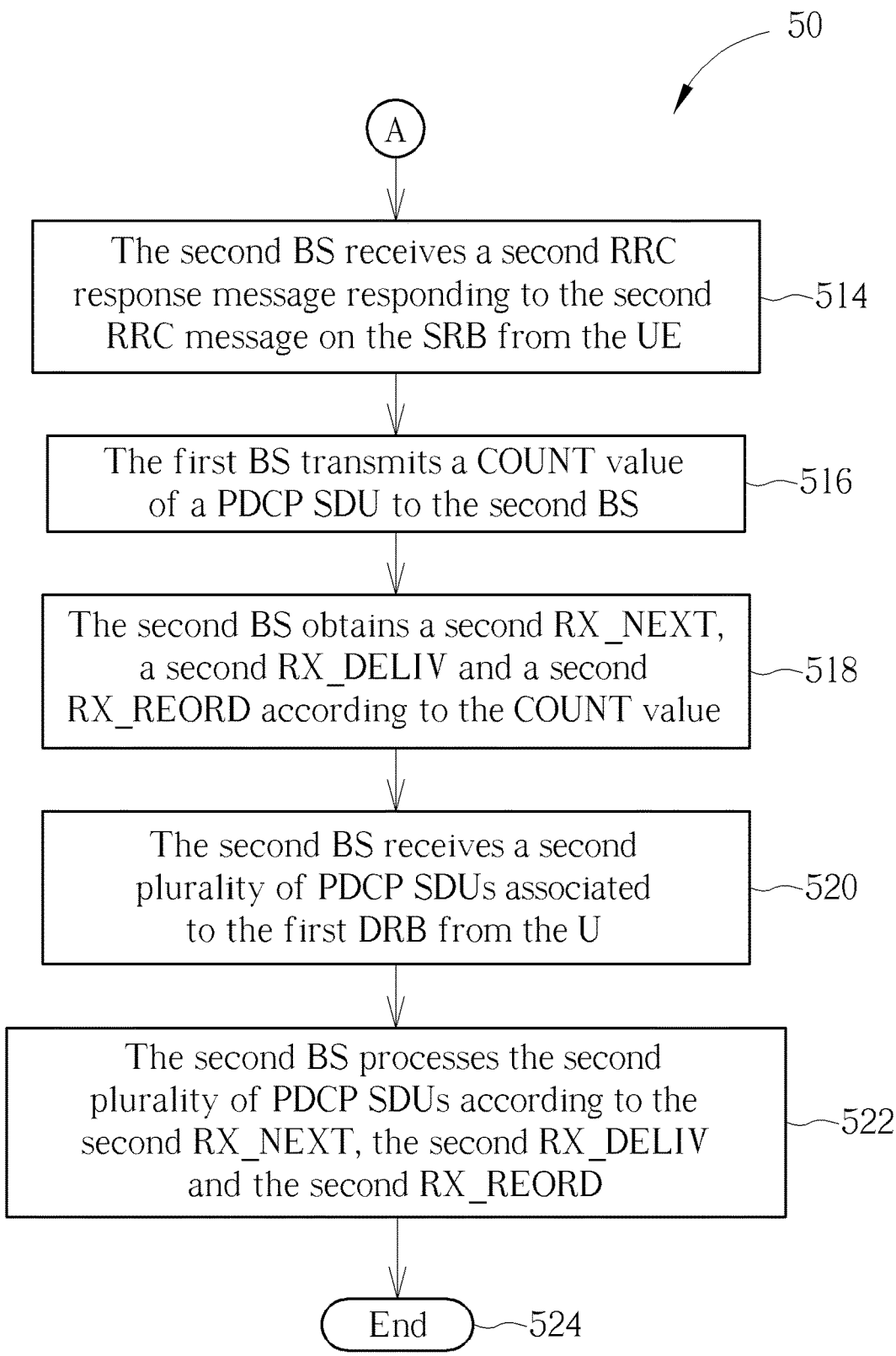

A process 50 in FIG. 5A and FIG. 5B is utilized in a network including a first BS (e.g., the BS 102) and a second BS (e.g., the BS 104), and includes the following steps:

Step 500: Start.

Step 502: The first BS transmits a first RRC message on a SRB to a UE, wherein the first RRC message configures a first DRB.

Step 504: The first BS receives a first RRC response message from the UE on the SRB, in response to the first RRC message.

Step 506: The first BS receives a first plurality of PDCP SDUs associated to the first DRB from the UE.

Step 508: The first BS processes the first plurality of PDCP SDUs according to a first RX_NEXT, a first RX_DELIV and a first RX_REORD which are associated to the first DRB.

Step 510: The first BS performs a handover preparation procedure with the second BS for the UE, to hand over the UE to the second BS.

Step 512: The first BS transmits a second RRC message on the SRB to the UE in response to the handover preparation procedure.

Step 514: The second BS receives a second RRC response message responding to the second RRC message on the SRB from the UE.

Step 516: The first BS transmits a COUNT value of a PDCP SDU to the second BS.

Step 518: The second BS obtains a second RX_NEXT, a second RX_DELIV and a second RX_REORD according to the COUNT value.

Step 520: The second BS receives a second plurality of PDCP SDUs associated to the first DRB from the UE.

Step 522: The second BS processes the second plurality of PDCP SDUs according to the second RX_NEXT, the second RX_DELIV and the second RX_REORD.

Step 524: End.

In one example, the first BS updates the first RX_NEXT, the first RX_DELIV and the first RX_REORD to other values (i.e., not initial values), when processing the first plurality of PDCP SDUs.

In one example, the first BS transmits the COUNT value to the second BS in response to the handover preparation procedure. In one example, the first BS transmits the COUNT value to the second BS via an interface (e.g., Xn interface) between the first BS and the second BS or via an interface between the first BS and a core network (e.g., an AMF). In the case of the interface between the first BS and the AMF, the AMF forwards the COUNT value to the second BS.

In one example, the PDCP SDU in the step 516 is a missing PDCP SDU, i.e., the first BS does not receive the PDCP SDU. The first BS may detect/determine the missing PDCP SDU from the first plurality of PDCP SDUs. For example, the first plurality of PDCP SDUs includes a first PDCP SDU and a second PDCP SDU. A SN of the first PDCP SDU is M, and a SN of the second PDCP SDU is N (N>M). Then, the first BS detects/determines the missing PDCP SDU which is a PDCP SDU with a SN=M+1, M+2, . . . , N−2 or N−1, because the UE does not receive PDCP SDUs with SNs=M+1, M+2, . . . , N−2 and N−1. The PDCP SDU may be a first missing PDCP SDU.

In one example, the second BS sets the second RX_NEXT to the COUNT value, sets the second RX_DELIV to the first RX_DELIV and the COUNT value and sets the second RX_REORD to the COUNT value.

In one example, the first BS transmits status information of at least one PDCP SDU (different from the first plurality of PDCP SDUs and the second plurality of PDCP SDUs) and the COUNT value. In one example, the status information includes (or indicates) at least one COUNT value of the at least one PDCP SDU which is missing. In one example, the status information includes a bitmap indicating which PDCP SDU(s) is missing and which PDCP SDU(s) is correctly received in a receiving PDCP entity associated to the first DRB. A bit position of the N-th bit in the bitmap is N, e.g., the bit position of the first bit in the bitmap is 1. An example of the bitmap is shown in FIG. 4.

In one example, the second BS obtains (e.g., determines, generates, or sets) the second RX_NEXT, the second RX_DELIV and the second RX_REORD for the first DRB according to a COUNT value of the first missing PDCP SDU and the status information. For example, the second BS sets the second RX_DELIV to the COUNT value. For example, the second BS sets the second RX_NEXT to a COUNT value of a last missing PDCP SDU derived from the COUNT value of the first missing PDCP SDU and the status information. For example, the second BS sets the second RX_NEXT to a first COUNT value plus 1 (e.g., second RX_NEXT=first COUNT value+1), wherein the first COUNT value is a COUNT value of a last PDCP SDU received by the first BS. For example, the first COUNT value is derived from the COUNT value of the first missing PDCP SDU plus a position of a last bit with a value=1 in the bitmap. The second BS may set the second RX_REORD in the same way as setting the second RX_NEXT or the second RX_DELIV as described above. For example, the second BS sets the second RX_REORD and the second RX_NEXT to the same value or sets the second RX_REORD and the second RX_DELIV to the same value.

In one example, after obtaining the second RX_NEXT, the second RX_DELIV and the second RX_REORD, the second BS updates the second RX_NEXT, the second RX_DELIV and the second RX_REORD when processing the second plurality of PDCP SDUs.

The following examples may be applied to the processes 30 and 50.

In one example, the second BS starts a t-Reordering timer associated to the first DRB in response to the handover preparation procedure, in response to the second RRC response message or when detecting a transmission from the UE. The transmission may be a random access (RA) preamble, a Physical UL Control Channel (PUCCH) transmission or a Physical UL Shared Channel (PUSCH) transmission.

In one example, the first BS processes a third plurality of PDCP SDUs associated to the first DRB according to a TX_NEXT to transmit the third plurality of PDCP SDUs to the UE. The first BS updates the TX_NEXT, when processing the third plurality of PDCP SDUs to be transmitted. In one example, the first BS transmits the TX_NEXT to the second BS in response to the handover preparation procedure. In one example, the second BS transmits a fourth plurality of PDCP SDUs associated to the first DRB to the UE according to the TX_NEXT.

In one example, the first BS transmits a third RRC message on the SRB to the UE, wherein the third RRC message configures a second DRB. The first BS receives a third RRC response message from the UE on the SRB, in response to the third RRC message. In one example, the first BS receives a fifth plurality of PDCP SDUs associated to the second DRB from the UE. The first BS processes the fifth plurality of PDCP SDUs according to a third RX_NEXT, a third RX_DELIV and a third RX_REORD which are associated to the second DRB. The first BS does not transmit the third RX_NEXT, the third RX_DELIV and the third RX_REORD to the second BS in response to the handover preparation procedure. The second BS obtains (e.g., sets, generates or creates) a fourth RX_NEXT, a fourth RX_DELIV and a fourth RX_REORD to (with) initial values (e.g., 0) for the second DRB. In one example, the second BS receives a sixth plurality of PDCP SDUs associated to the second DRB from the UE. The second BS processes the sixth plurality of PDCP SDUs according to the fourth RX_NEXT, the fourth RX_DELIV and the fourth RX_REORD.

In one example, the first BS maintains a fifth RX_NEXT, a fifth RX_DELIV and a fifth RX_REORD associated to the SRB for receiving RRC messages on the SRB. The first BS does not transmit the fifth RX_NEXT, the fifth RX_DELIV and the fifth RX_REORD to the second BS in response to the handover preparation procedure. The second BS sets a sixth RX_NEXT, a sixth RX_DELIV and a sixth RX_REORD to initial values (e.g., 0) for the SRB after the handover to receive PDCP PDUs including RRC messages from the UE.

In one example, the UE disconnects from the first BS in response to the second RRC message. In one example, the RRC message above is a RRC Reconfiguration message, and the RRC response message above is a Reconfiguration Complete message.

In one example, the first DRB is an acknowledged mode (AM) DRB (i.e., configured to use a RLC AM), and the second DRB is an unacknowledged mode (UM) DRB (i.e., configured to use a RLC UM).

In one example, the UE/the first BS/the second BS transmits a PDCP SDU via a PDCP entity associated to a RB. The UE/the first BS/the second BS associates the COUNT value corresponding to the TX_NEXT to the PDCP SDU. Then, the UE/the first BS/the second BS performs a header compression (if configured) of the PDCP SDU, and performs an integrity protection (if configured) and a ciphering (if configured) according to the TX_NEXT. The UE/the first BS/the second BS sets a PDCP SN in a PDCP Data PDU including the PDCP SDU (which may be compressed, integrity protected and/or ciphered) to the TX_NEXT modulo $2^{[pdcp\text{-}SN\text{-}Size]}$. The pdcp-SN-Size is configured in a first PDCP configuration. The pdcp-SN-Size is 262143, if the PDCP entity is configured for the use of a 18-bit SN. The pdcp-SN-Size is 4095, if the PDCP entity is configured for the use of a 12-bit SN. A pdcp-SN-Size configured in a second PDCP configuration may be different from the pdcp-SN-Size configured in the first PDCP configuration. Then, the UE/the first BS/the second BS increases the TX_NEXT by 1, and submits the PDCP Data PDU including the PDCP SDU (which may be compressed, integrity protected and/or ciphered) to a lower layer (e.g., RLC layer).

In one example, the UE/the first BS/the second BS determines the COUNT value of the PDCP Data PDU, i.e., a RCVD_COUNT, via the PDCP entity associated to the RB, after receiving the PDCP Data PDU from the lower layer. For example, the RCVD_COUNT is between a RCVD_HFN and a RCVD_SN (i.e., RCVD_COUNT= [RCVD_HFN, RCVD_SN]). The RCVD_HFN is equal to a HFN(RX_DELIV) plus 1, if the RCVD_SN is smaller than a SN(RX_DELIV) minus a Window_Size. The RCVD_HFN is equal to the HFN(RX_DELIV) minus 1, if the RCVD_SN is greater than or equal to the SN(RX_DELIV) minus the Window_Size. Otherwise, the RCVD_HFN is equal to the HFN (RX_DELIV). The HFN (RX_DELIV) indicates a Hyper Frame Number (HFN) part (i.e., a number of most significant bits equal to a HFN length) of the RX_DELIV. The SN(RX_DELIV) indicates a SN part (i.e., a number of least significant bits equal to a PDCP SN length) of the RX_DELIV. The RCVD_SN is a PDCP SN of the PDCP Data PDU, included in a PDU header. The RCVD_HFN is a HFN of the PDCP Data PDU, calculated by the receiving PDCP entity. The RCVD_COUNT is the COUNT value of the PDCP Data PDU.

In one example, the UE/the first BS/the second BS performs a deciphering and an integrity verification of the PDCP Data PDU according to the RCVD_COUNT, after determining the RCVD_COUNT. If the integrity verification fails, the UE/the first BS/the second BS indicates an integrity verification failure to an upper layer and discards the PDCP Data PDU.

In one example, the UE/the first BS/the second BS stores a resulting PDCP SDU in a reception buffer, if the PDCP Data PDU with the RCVD_COUNT is not discarded. If the RCVD_COUNT is greater than or equal to the RX_NEXT, the UE/the first BS/the second BS updates the RX_NEXT to the RCVD_COUNT plus 1. If the RCVD_COUNT is equal to the RX_NEXT, the UE/the first BS/the second BS delivers to upper layers in ascending order of the associated COUNT value after performing a header decompression, and updates the RX_DELIV to a COUNT value of a last PDCP SDU delivered to the upper layers plus 1. If an outOfOrderDelivery is configured and if the resulting PDCP SDU has not been delivered to the upper layers, the UE/the first BS/the second BS delivers the resulting PDCP SDU to the upper layers. If a t-Reordering is running and if the PDCP SDU with a COUNT value equal to the RX_REORD minus 1 is delivered to the upper layers, the UE/the first BS/the second BS stops and resets the t-Reordering. If the t-Reordering is not running (includes the case when the t-Reordering is stopped due to actions above) and if there is at least one stored PDCP SDU, the UE/the first BS/the second BS updates the RX_REORD to the RX_NEXT and starts the t-Reordering.

In one example, the Window_Size indicates a size of a reordering window. The value of the Window_Size is equal to $2^{[pdcp\text{-}SN\text{-}Size]-1}$. In one example, the t-Reordering is a timer. Duration of the timer is configured by the upper layer (e.g., RRC layer). The timer is used to detect loss of PDCP Data PDUs. If the t-Reordering is running, the t-Reordering shall not be started additionally, i.e., only one t-Reordering per a receiving PDCP entity is running at a given time.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling state variables such as a RX_NEXT, a RX_DELIV and a RX_REORD to process a plurality of PDCP SDUs after a handover. Thus, the problem of handling the handover is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network comprising a first base station (BS) and a second BS for handling a handover, comprising:
   at least one storage device; and
   at least one processing circuit, coupled to the at least one storage device, wherein the at least one storage device stores, and the at least one processing circuit is configured to execute instructions of:
   the first BS transmitting a first Radio Resource Control (RRC) message on a signaling radio bearer (SRB) to a communication device, wherein the first RRC message configures a data radio bearer (DRB);
   the first BS receiving a first RRC response message from the communication device on the SRB, in response to the first RRC message;
   the first BS receiving a first plurality of Packet Data Convergence Protocol (PDCP) Service Data Units (SDUs) associated to the DRB from the communication device;
   the first BS processing the first plurality of PDCP SDUs according to a RX_NEXT, a RX_DELIV and a RX_REORD which are associated to the DRB;
   the first BS performing a handover preparation procedure with the second BS for the communication device, to hand over the communication device to the second BS;
   the first BS transmitting a second RRC message on the SRB to the communication device in response to the handover preparation procedure;
   the second BS receiving a second RRC response message responding to the second RRC message on the SRB from the communication device;
   the first BS transmitting at least two of the RX_NEXT, the RX_DELIV and the RX_REORD to the second BS;
   the second BS receiving a second plurality of PDCP SDUs associated to the DRB from the communication device; and
   the second BS processing the second plurality of PDCP SDUs according to the at least two of the RX_NEXT, the RX_DELIV and the RX_REORD.

2. The network of claim 1, wherein the instructions further comprise:
   the first BS transmitting the at least two of the RX_NEXT, the RX_DELIV and the RX_REORD to the second BS via an interface between the first BS and the second BS or via an interface between the first BS and a core network.

3. The network of claim 1, wherein the instructions further comprise:
   the first BS updating the RX_NEXT, the RX_DELIV and the RX_REORD, when processing the first plurality of PDCP SDUs.

4. The network of claim 1, wherein the instructions further comprise:
   the first BS transmitting status information;
   wherein the status information comprises at least one COUNT value of at least one PDCP SDU which is missing.

5. A network comprising a first base station (BS) and a second BS for handling a handover, comprising:
   at least one storage device; and
   at least one processing circuit, coupled to the at least one storage device, wherein the at least one storage device stores, and the at least one processing circuit is configured to execute instructions of:
   the first BS transmitting a first Radio Resource Control (RRC) message on a signaling radio bearer (SRB) to a communication device, wherein the first RRC message configures a data radio bearer (DRB);
   the first BS receiving a first RRC response message from the communication device on the SRB, in response to the first RRC message;
   the first BS receiving a first plurality of plurality of Packet Data Convergence Protocol (PDCP) Service Data Units (SDUs) associated to the DRB from the communication device;
   the first BS processing the first plurality of PDCP SDUs according to a first RX_NEXT, a first RX_DELIV and a first RX_REORD which are associated to the DRB;
   the first BS performing a handover preparation procedure with the second BS for the communication device, to hand over the communication device to the second BS;
   the first BS transmitting a second RRC message on the SRB to the communication device in response to the handover preparation procedure;
   the second BS receiving a second RRC response message responding to the second RRC message on the SRB from the communication device;
   the first BS transmitting a COUNT value of a PDCP SDU to the second BS;
   the second BS obtaining a second RX_NEXT, a second RX_DELIV and a second RX_REORD according to the COUNT value;
   the second BS receiving a second plurality of PDCP SDUs associated to the DRB from the communication device; and
   the second BS processing the second plurality of PDCP SDUs according to the second RX_NEXT, the second RX_DELIV and the second RX_REORD.

6. The network of claim 5, wherein the instructions further comprise:
   the first BS updating the first RX_NEXT, the first RX_DELIV and the first RX_REORD, when processing the first plurality of PDCP SDUs.

7. The network of claim 5, further comprising:
   the first BS transmitting the COUNT value to the second BS via an interface between the first BS and the second BS or via an interface between the first BS and a core network.

8. The network of claim 5, wherein the instructions further comprise:
the first BS transmitting status information;
wherein the status information comprises at least one COUNT value of at least one PDCP SDU which is missing.

9. The network of claim 8, wherein the instructions further comprise:
the second BS obtaining the second RX_NEXT, the second RX_DELIV and the second RX_REORD according to the COUNT value of the PDCP SDU and the status information.

10. A method for handling a handover, comprising:
a first base station (BS) transmitting a first Radio Resource Control (RRC) message on a signaling radio bearer (SRB) to a communication device, wherein the first RRC message configures a data radio bearer (DRB);
the first BS receiving a first RRC response message from the communication device on the SRB, in response to the first RRC message;
the first BS receiving a first plurality of plurality of Packet Data Convergence Protocol (PDCP) Service Data Units (SDUs) associated to the DRB from the communication device;
the first BS processing the first plurality of PDCP SDUs according to a first RX_NEXT, a first RX_DELIV and a first RX_REORD which are associated to the DRB;
the first BS performing a handover preparation procedure with the second BS for the communication device, to hand over the communication device to the second BS;
the first BS transmitting a second RRC message on the SRB to the communication device in response to the handover preparation procedure;
the second BS receiving a second RRC response message responding to the second RRC message on the SRB from the communication device;
the first BS transmitting a COUNT value of a PDCP SDU to the second BS;
the second BS obtaining a second RX_NEXT, a second RX_DELIV and a second RX_REORD according to the COUNT value;
the second BS receiving a second plurality of PDCP SDUs associated to the DRB from the communication device; and
the second BS processing the second plurality of PDCP SDUs according to the second RX_NEXT, the second RX_DELIV and the second RX_REORD.

11. The method of claim 10, wherein the instructions further comprise:
the first BS updating the first RX_NEXT, the first RX_DELIV and the first RX_REORD, when processing the first plurality of PDCP SDUs.

12. The method of claim 10, further comprising:
the first BS transmitting the COUNT value to the second BS via an interface between the first BS and the second BS or via an interface between the first BS and a core network.

13. The network of claim 10, wherein the instructions further comprise:
the first BS transmitting status information;
wherein the status information comprises at least one COUNT value of at least one PDCP SDU which is missing.

14. The network of claim 13, wherein the instructions further comprise:
the second BS obtaining the second RX_NEXT, the second RX_DELIV and the second RX_REORD according to the COUNT value of the PDCP SDU and the status information.

* * * * *